(12) United States Patent
Smyth (10) Patent No.: US 7,804,486 B2
(45) Date of Patent: Sep. 28, 2010

(54) TRACKBALL SYSTEMS AND METHODS FOR ROTATING A THREE-DIMENSIONAL IMAGE ON A COMPUTER DISPLAY

(76) Inventor: Robert W. Smyth, 57 Cedar Grove Rd., Toms River, NJ (US) 08753

( * ) Notice: Subject to any disclaimer, the term of this patent is extended or adjusted under 35 U.S.C. 154(b) by 652 days.

(21) Appl. No.: 11/278,961

(22) Filed: Apr. 6, 2006

(65) Prior Publication Data

US 2007/0236457 A1 Oct. 11, 2007

(51) Int. Cl.
*G09G 5/08* (2006.01)

(52) U.S. Cl. ..................... 345/167

(58) Field of Classification Search ......... 345/156–168; 341/162–167, 20–22
See application file for complete search history.

(56) References Cited

U.S. PATENT DOCUMENTS

| | | | |
|---|---|---|---|
| 5,288,993 A | 2/1994 | Bidiville et al. | |
| 5,298,919 A * | 3/1994 | Chang | 345/163 |
| 5,565,891 A | 10/1996 | Armstrong | |
| 5,751,275 A | 5/1998 | Bullister | |
| 6,164,808 A * | 12/2000 | Shibata et al. | 700/85 |
| 6,466,831 B1 * | 10/2002 | Shibata et al. | 700/85 |
| 6,670,947 B2 * | 12/2003 | Smyth | 345/167 |
| 6,985,134 B2 | 1/2006 | Suprun et al. | |

* cited by examiner

*Primary Examiner*—Chanh Nguyen
*Assistant Examiner*—Tsegaye Seyoum
(74) *Attorney, Agent, or Firm*—Jacobs & Kim LLP; Daniel Kim, Esq.

(57) ABSTRACT

A trackball rotates a three-dimensional image displayed by a computer. Displacement data is generated for designated first and second non-antipodal points on the surface of the trackball's roller ball, for displacement of the designated first and second points during a time interval between a starting time and an ending time. The displacement data is used to generate a rotational transformation that is representative of a change in rotational orientation of the roller ball occurring during the time interval. The generated transformation is then applied to the displayed computer image to cause the image to be rotated around an image pivot point in correspondence with the rotation of the roller ball around its center.

19 Claims, 11 Drawing Sheets

$$(1) \quad \vec{a'} = (\cos\phi_1)\vec{a} + (\sin\phi_1)\frac{\Delta x_1 \vec{S_{1x}} + \Delta y_1 \vec{S_{1y}}}{\sqrt{(\Delta x_1)^2 + (\Delta y_1)^2}}$$

$$(2) \quad \phi_1 = f\sqrt{(\Delta x_1)^2 + (\Delta y_1)^2}$$

$$(3) \quad \vec{b'} = (\cos\phi_2)\vec{b} + (\sin\phi_2)\frac{\Delta x_2 \vec{S_{2x}} + \Delta y_2 \vec{S_{2y}}}{\sqrt{(\Delta x_2)^2 + (\Delta y_2)^2}}$$

$$(4) \quad \phi_2 = f\sqrt{(\Delta x_2)^2 + (\Delta y_2)^2}$$

$$(5) \quad (\vec{a}, \vec{b}) \mapsto (\vec{a'}, \vec{b'})$$

$$(6) \quad M_{t+\Delta t} = R \cdot M_t$$

$$(7) \quad R = \begin{bmatrix} | & | & | \\ \vec{a'} & \vec{b'} & \vec{a'} \times \vec{b'} \\ | & | & | \end{bmatrix} \begin{bmatrix} | & | & | \\ \vec{a} & \vec{b} & \vec{a} \times \vec{b} \\ | & | & | \end{bmatrix}^{-1}$$

FIG. 6

$$(8) \quad R = \begin{bmatrix} X_1 & X_2 & X_3 \\ Y_1 & Y_2 & Y_3 \\ Z_1 & Z_2 & Z_3 \end{bmatrix}$$

FIG. 7

IF ($\Delta x_1 = 0$ AND $\Delta y_1 = 0$)

THEN $(X_3, Y_3, Z_3) \leftarrow (0, 0, 1)$

ELSE $X_3 \leftarrow \dfrac{-\Delta y_1 \sin\left(f\sqrt{(\Delta x_1)^2 + (\Delta y_1)^2}\right)}{\sqrt{(\Delta x_1)^2 + (\Delta y_1)^2}}$ $$Y_3 \leftarrow \dfrac{-\Delta x_1 \sin\left(f\sqrt{(\Delta x_1)^2 + (\Delta y_1)^2}\right)}{\sqrt{(\Delta x_1)^2 + (\Delta y_1)^2}}$$

$$Z_3 \leftarrow \cos\left(f\sqrt{(\Delta x_1)^2 + (\Delta y_1)^2}\right)$$

IF ($\Delta x_2 = 0$ AND $\Delta y_2 = 0$)

THEN $(X_1, Y_1, Z_1) \leftarrow (1, 0, 0)$

ELSE $X_1 \leftarrow \cos\left(f\sqrt{(\Delta x_2)^2 + (\Delta y_2)^2}\right)$ $$Y_1 \leftarrow \dfrac{\Delta x_2 \sin\left(f\sqrt{(\Delta x_2)^2 + (\Delta y_2)^2}\right)}{\sqrt{(\Delta x_2)^2 + (\Delta y_2)^2}}$$

$$Z_1 \leftarrow \dfrac{-\Delta y_2 \sin\left(f\sqrt{(\Delta x_2)^2 + (\Delta y_2)^2}\right)}{\sqrt{(\Delta x_2)^2 + (\Delta y_2)^2}}$$

TRACKBALL SYSTEMS AND METHODS FOR ROTATING A THREE-DIMENSIONAL IMAGE ON A COMPUTER DISPLAY

BACKGROUND OF THE INVENTION

1. Field of the Invention

The present invention relates to improvements in the field of computer input devices, and more specifically to improved trackball systems and methods for rotating a three-dimensional image on a computer display.

2. Description of Prior Art

Computers are used to generate three-dimensional images in a variety of contexts. Three-dimensional images are used, for example, in computer-aided design (CAD), medical imaging, and computer games. Current systems commonly provide a user with the ability to rotate a displayed three-dimensional image around one or more axes. However, the user interface in these systems is often cumbersome.

For example, in certain systems, a user rotates a displayed image by using a mouse to click on on-screen arrows or by pressing designated keys on a computer keyboard. The displayed image then rotates around axes generally indicated by the user input. Other systems allow a user to rotate a displayed image by manipulating a trackball. In these systems, the displayed image rotates generally in a manner related to the trackball input.

One problem with the above systems is that they are often non-intuitive. It can require time for a user to become proficient with these input systems. Even an experienced user may, at times, find it difficult to quickly and reliably obtain a desired rotation of a displayed image.

SUMMARY OF THE INVENTION

These and other issues are addressed by the present invention, aspects of which provide trackball systems and methods for rotating a three-dimensional image displayed by a computer. In a method according to one aspect of the invention, displacement data is generated for designated first and second non-antipodal points on the surface of the trackball's roller ball for displacement occurring during a time interval between a starting time and an ending time. The displacement data is then used to generate a transformation representing change in rotational orientation of the roller ball occurring during the time interval. The generated transformation is then applied to the displayed image to rotate the image around an image pivot point in correspondence with the rotation of the roller ball around its center point. Further aspects of the invention are directed to a trackball system and to a trackball unit for rotating a displayed image as described.

Additional features and advantages of the present invention will become apparent by reference to the following detailed description and accompanying drawings.

DETAILED DESCRIPTION

The present invention provides trackball systems and methods for controlling, in a natural and intuitive manner, the rotation of a three-dimensional image on a computer display. A new user requires little or no practice to achieve a high level of proficiency in manipulating an image using a trackball according to the invention. It will be appreciated that the described systems and methods can be applied in a wide variety of computing environments, including computer-aided design, computer gaming, medical imaging, and the like.

As used herein, the term "computer display" generally refers to devices used by a computer to display an image to a user. The term "computer display" includes computer monitors, and also other types of display devices, such as television screens, projected images, holograms, "virtual reality" devices, and the like.

As used herein, the term "trackball" is used to describe a user input device including a roller ball and associated position sensors, electronics, and structural components. The term "trackball" includes both stand-alone units and subassemblies within a larger structure, such as a computer keyboard, workstation, or the like. For the purpose of the present discussion, the trackball's roller ball is mapped onto a Cartesian coordinate system, with the center point of the roller ball corresponding to the origin of the roller ball coordinate system. However, it will be appreciated that the present invention is not limited to a particular system for representing the orientation of the roller ball. Further, although the invention is described with respect to the spherical outer surface of a roller ball trackball, the scope of the present invention would also extend, for example, to a hollow roller ball, having an interior spherical surface. In that case, the two designated non-antipodal points could be on the interior surface of the roller ball rather than on its outer surface.

As used herein, the term "three-dimensional image" generally refers to a computer-generated image in which perspective and other techniques have been incorporated to create a visual impression of a three-dimensional object. When it is said herein that a three-dimensional image is "rotated," what is meant is that the displayed image is modified to create a visual impression, from the point of view of a user of the system, that the displayed object has been rotated around an "image pivot point." The image pivot point is not necessarily the center point of the three-dimensional object.

When it is said herein that a three-dimensional image is rotated "in correspondence with" the rotation of a trackball's roller ball, what is meant is that, from the user's point of view, the rotation of the displayed object generally matches the rotation of the roller ball. In effect, the axis of rotation of the roller ball around its center in the "roller ball universe" is translated to the "displayed image universe" such that the direction of rotation of the displayed image matches the direction of rotation of the roller ball. According to an aspect of the invention, the magnitude of rotation of the displayed image is matched to the rotation of the roller ball, to create a one-to-one ratio between the rotation of the displayed image and the rotation of the roller ball. However, as discussed below, the ratio between the magnitude of rotation of the displayed image and the magnitude of rotation of the roller ball can be modified, if desired, without departing from the spirit of the invention.

For the purpose of the present discussion, it is assumed that the three-dimensional image is mapped onto a Cartesian coordinate system, and that the image pivot point corresponds to the origin of the image coordinate system. However, it will be appreciated that the present invention is not limited to a particular system for representing and controlling the orientation of a displayed three-dimensional image.

As used herein, the term "designated first and second roller ball surface points" refers to first and second points on the surface of the trackball's roller ball that are designated for monitoring by a position sensor, or a pair of position sensors, during a given time interval. According to an aspect of the invention, the designation of first and second points occurs at the start of each successive time interval. It should be noted that for a given time interval, one or both of the designated first and second roller ball surface points may be identical to points designated in an earlier time interval. As discussed below, according to an aspect of the present invention, position sensing is performed at first and second stationary reference points. In that system, the designated first and second roller ball surface points are those points on the roller ball surface that are located at the first and second stationary reference points at the start of a given time interval.

A first aspect of the invention provides a method for rotating a displayed image around an image pivot point in correspondence with the rotation of a trackball roller ball. The method is based on the principle that it is possible to uniquely identify a change in the rotational orientation of the roller ball by considering only the displacement of two designated points on the surface of the roller ball. The designated points must be non-antipodal, that is, a line connecting the designated first and second points cannot pass through the center of the roller ball. It will be seen that, if the points are antipodal, their displacement will not reflect rotation around an axis including the two designated points. Once the displacement data for the two designated points has been obtained, it is then possible to use that data to generate a transformation that can be applied to the displayed image to cause it to be rotated in correspondence with the rotation of the roller ball.

Figure 1:
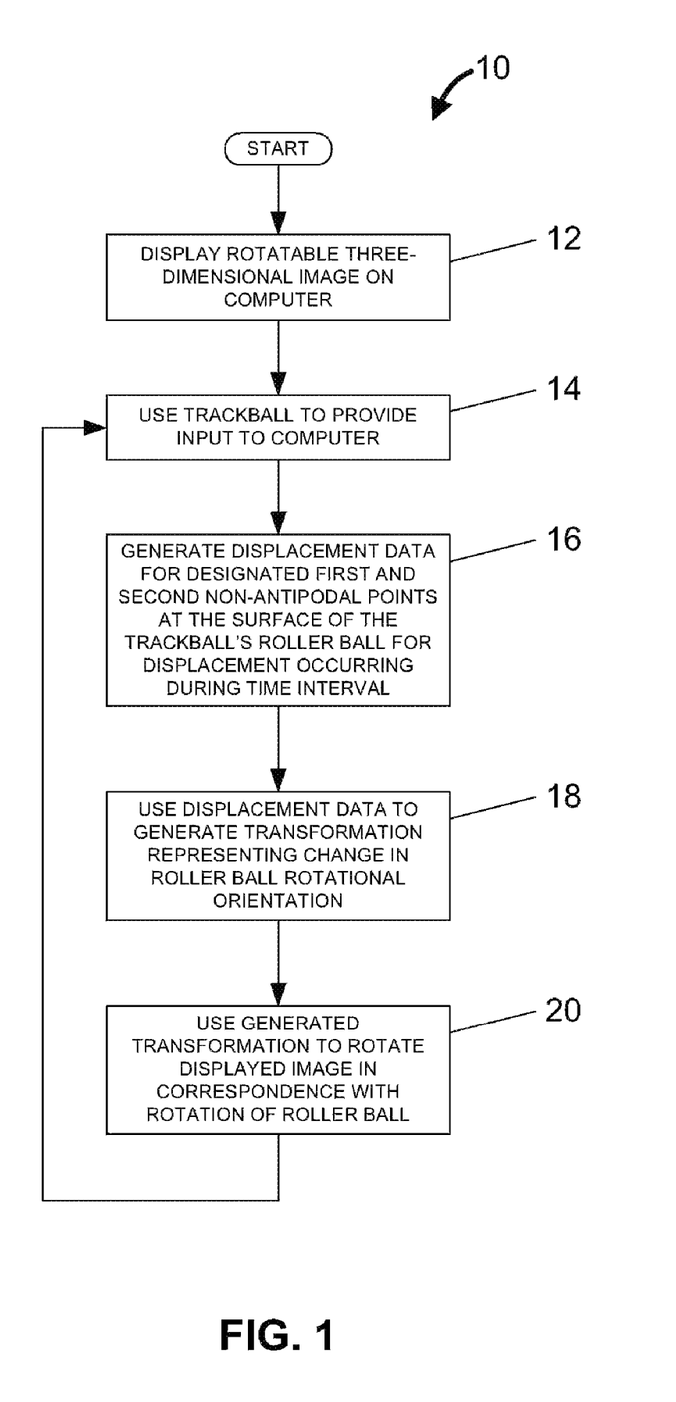
FIG. 1 shows a flowchart of a method according to a first aspect of the present invention for using a trackball to rotate a three-dimensional image.

FIG. 1 shows a flowchart 10 illustrating the above-described method. In step 12, a three-dimensional image is displayed by a computer in a manner that allows the image to be rotated around an image pivot point. As mentioned above, the image pivot point does not necessarily correspond with the center of the displayed object.

In step 14, a trackball provides input to the computer. The trackball may be a separate unit that is connected to the computer using, for example, a USB or wireless connection. The trackball may also be integrated with a keyboard, mouse, workstation, or the like. The trackball includes a spherical roller ball that is rotatable around its center point.

In step 16, displacement data is generated for designated first and second non-antipodal points on the roller ball surface for displacement occurring over a defined time interval Δt, between a starting time t and an ending time t+Δt. As mentioned above, according to an aspect of the invention, the displayed image is rotated such that its rotation matches that of the roller ball in direction.

According to an aspect of the invention, the magnitude of rotation of the displayed image is equal to the magnitude of rotation of the roller ball. According to a further aspect of the invention, the ratio of the magnitude of rotation of the displayed image to the magnitude of rotation of the roller ball is adjusted for various purposes. For example, the ratio can be adjusted such that a proportionately greater amount of rotation of the roller ball is required to produce a given amount of rotation of the displayed image. This ratio could be used, for example, where a fine level of control is required. Alternatively, for example, the ratio can be adjusted to create a reversed or mirror-image relationship between the rotation of the roller ball and the rotation of the displayed image. Any desired adjustment to the ratio can be accomplished by scaling the displacement data accordingly.

In step 18, the displacement data is used to generate a transformation that represents the change, if any, in the rotational orientation of the roller ball. As described in further detail below, according to an aspect of the invention, the transformation may take the form of a transformation matrix.

In step 20, the generated transformation is used to rotate the displayed image in correspondence with the rotation of the roller ball. Steps 14 through 20 are repeated for successive time intervals. According to a further aspect of the invention, the successive time intervals are sufficiently short to create a general visual impression of a smooth and continuous rotation of the visual image in response to trackball inputs.

As discussed above, according to an aspect of the invention, the first and second points are designated for each successive time interval. For example, if first and second sensors with fixed locations are used to generate displacement data, the designated points are determined by which roller ball surface points are located at the first and second sensors at the start of a given time interval. It should be noted that, as discussed below, it is possible for one or both designated points to be identical to points that have been previously designated.

According to a further aspect of the invention, the above-described technique is implemented using an optical trackball. A typical optical trackball includes a spherical roller ball that is speckled, or otherwise optically scannable. It should be noted that the invention may also be implemented with other types of trackball systems, so long as those systems can be modified to generate displacement data for designated first and second non-antipodal points, as described herein. It is therefore not intended to limit the scope of the present invention to optical trackballs.

Figure 2:
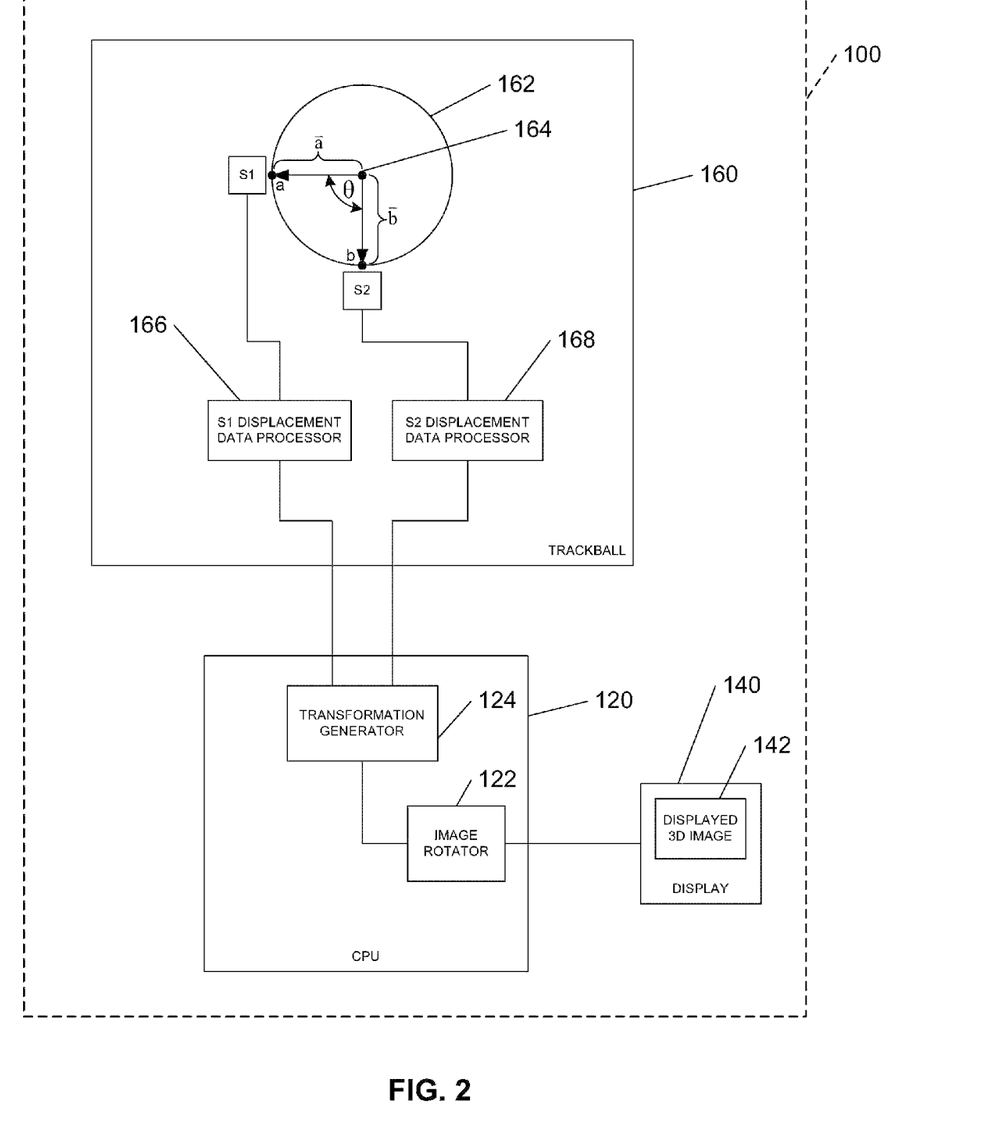
FIG. 2 shows a diagram of a trackball system according to a further aspect of the present invention.

FIG. 2 shows a diagram of a system 100 according to a further aspect of the invention. The system 100 includes a central processing unit (CPU) 120, to which there have been connected a display 140, and a trackball 160. For the sake of the present discussion, the CPU 120, display 140, and trackball 160 have been illustrated as separate units. However, it would also be within the spirit of the present invention to integrate two or more of these items into a single unit, or move components from one unit to another or to subdivide components and move one or more subdivisions to separate or other units. Further for the sake of discussion, hardware and software components not required for an understanding of the present invention have been omitted.

The CPU 120 causes a three-dimensional image 142 to be displayed on the display 140, and includes an image rotator 122. As used herein, the term "image rotator" generally refers to any software or hardware components or other resources used by the CPU 120 to control the rotational orientation of the displayed image 142. For the purposes of the present discussion, it is assumed that the image rotator 122 uses a 3×3 image orientation matrix to represent and control the rotational orientation of the displayed image 142. However, it will be appreciated that the present invention may also be practiced using other types of image rotators 122 and other types of systems for representing and controlling the rotation of the displayed image.

The trackball 160 includes a roller ball 162 that rotates around its center point 164. As discussed above, displacement data is generated for designated first and second non-antipodal points a and b on the surface of the roller ball. In the FIG. 2 system, this displacement data is generated using first and second photosensors S1 and S2 and their respective data processors 166 and 168. It should be noted that, depending upon the particular operating environment, the outputs of data processors 166 and 168 may be further processed by device drivers, and the like, before being provided to the transformation generator 124.

First and second photosensors S1 and S2 are positioned with respect to the roller ball 162 to monitor, respectively, designated first and second non-antipodal points a and b on the surface of the roller ball 162. For the purposes of the present discussion, there are also defined vectors $s_a$ and $s_b$, which extend from the center of the roller ball to points a and b, respectively.

It should be noted that although the invention is described with respect to a trackball having first and second photosensors S1 and S2 and displacement data processors 166 and 168, it would also be possible to practice the present invention using a system including a single sensor and displacement data processor capable of generating displacement data for designated first and second non-antipodal points. Theoretically, any two non-antipodal points can be used for the techniques described herein. However, if the designated first and second points are too close to each other or too nearly antipodal, it may be difficult to achieve the necessary level of precision to obtain acceptable results, given the net effect of measurement errors. Using first and second sensors allows a relatively wide degree of separation between the designated first and second points. However, if the necessary level of precision is attainable, it would also be possible to use a single sensor, instead of a pair of sensors. It would also be possible to use a single sensor, if the sensor has a large enough scanning area to provide sufficient separation between the designated first and second points. However, it should be noted that using a sensor with a relatively large scanning area may introduce other issues including, for example, issues arising from the curvature of the roller ball's surface.

In the FIG. 2 system, vectors $s_a$ and $s_b$ are perpendicular, that is, the angle θ of separation between sensors S1 and S2 is 90°. However, angle θ is arbitrary, and may be adjusted as dictated by other design considerations, so long as the designated first and second points a and b are non-antipodal.

Photosensors S1 and S2 each include an array of photodetectors that generate outputs in response to light reflected off of the surface of the roller ball 162. The data processing circuitry 166 and 168 converts the outputs of the photodetector arrays of photosensors S1 and S2 into displacement data. As discussed further below, each photodetector array defines a respective coordinate system having an x-axis and a y-axis. Thus, the data outputs of the first and second displacement data processors 166 and 168 provide x-axis and y-axis displacement data for each of the designated first and second points a and b.

The x-axis and y-axis displacement data for the designated first and second points a and b is then provided as an input to a transformation generator 124. According to the present aspect of the invention, the transformation generator 124 is a software module that is executed by the CPU 120. However, it will be appreciated that the transformation generator 124 may be included as part of the trackball 160 and may, for example, be incorporated into the trackball's firmware.

The transformation generator 124 converts the displacement data into a rotational transformation matrix that is then provided as an input to the image rotator 122. The image rotator 122 then uses the transformation matrix to rotate the displayed image, as further described herein.

It should be noted that in the FIG. 2 system 100, it is necessary to align the trackball 160 with the display 140. This alignment can be accomplished in a number of ways including, for example, by providing the trackball unit with a clearly marked, or intuitively obvious, "front" side. Further, if desired, a software utility can be provided to allow the alignment of the trackball to be adjusted by the user. This software utility could, for example, also be used to adjust the rotation ratio, discussed above.

A working prototype of the trackball 160 shown in FIG. 2 has been constructed by disassembling a pair of commercially available trackballs and using the parts to construct a single trackball. The chassis of a first trackball, including the first trackball's photodetector array, associated circuitry, and connecting cable, was cut away from the first trackball's housing and roller ball. A portion of the housing of the second trackball was cut away. Then, the first trackball chassis was mounted with respect to the second trackball such that both the first trackball and second trackball photodetectors were in position to scan the surface of the roller ball of the second trackball. The cable from the first trackball chassis and the cable from the second trackball were then connected to a computer to provide displacement data from the two sensors.

Figure 3:
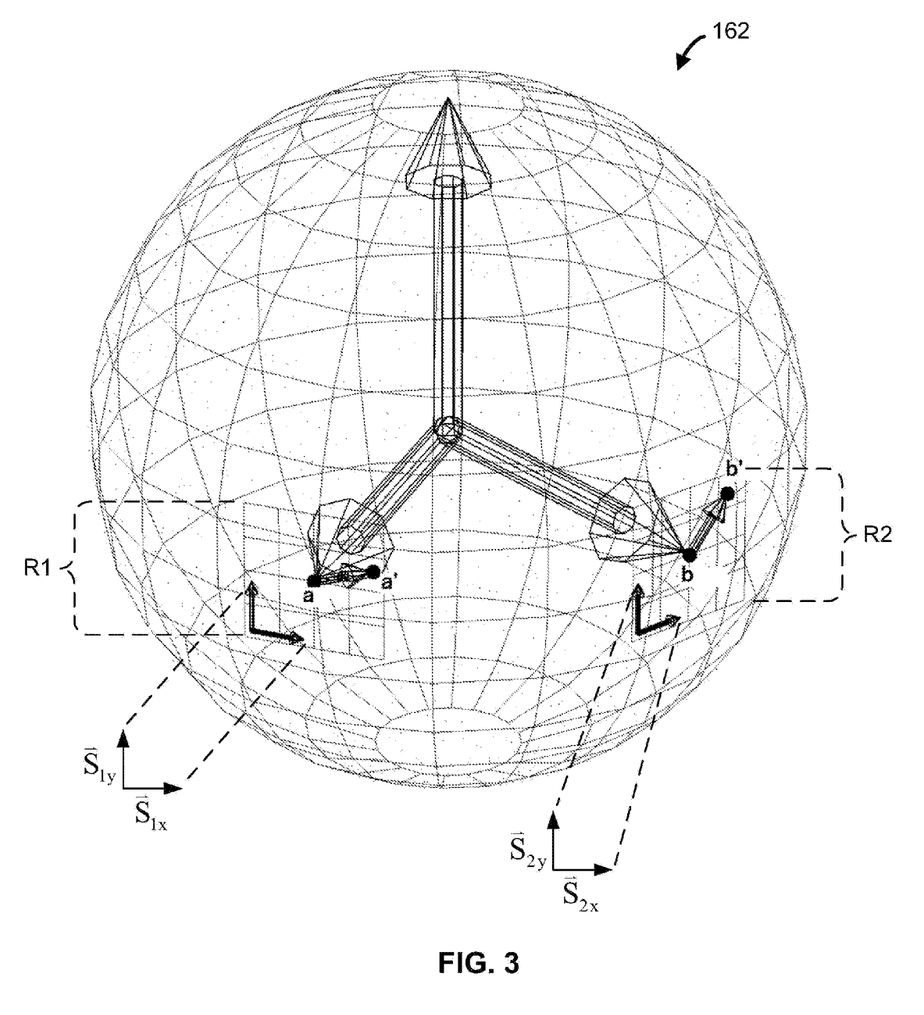
FIG. 3 shows a graphical representation of a roller ball in a trackball system according to the present invention.

According to a further aspect of the invention, the above-described technique is implemented using vector-based analysis to populate a rotational transformation matrix. For the purposes of this analysis, a roller ball is modeled as a sphere in a three-dimensional coordinate system, in which the center point of the roller ball is located at the origin, and with the unit of length chosen so that the radius of the roller ball is one. FIG. 3 shows a graphical representation of this model of the roller ball 162.

As shown in FIG. 3, the surface of the roller ball 162 includes two regions R1 and R2, which correspond to the regions of the roller ball surface that are scanned by photosensors S1 and S2. As further shown in FIG. 3, each of regions R1 and R2 is represented by an individual coordinate system, each having a local x-axis and y-axis. The respective directions of the R1 x-axis and y-axis are represented in the three-dimensional coordinate system as unit vectors $s_{1x}$ and $s_{1y}$ (not drawn to scale). The respective directions of the R2 x-axis and y-axis are represented in the three-dimensional coordinate system as unit vectors $s_{2x}$ and $s_{2y}$.

The designated first point a is located at or near the origin of the R1 coordinate system, and the designated second point b is located at or near the origin of the R2 coordinate system. Generally speaking, the location of points a and b are fixed at stationary reference locations within the R1 and R2 coordinate systems. For each successive interval, the designated first and second points a and b are those points on the roller ball surface that happen to be located at the stationary reference locations in regions R1 and R2 at the start of the time interval.

Points a and b are monitored beginning at a starting time t for a time interval Δt, until an ending time t+Δt. For the purposes of the present discussion, the ending positions of points a and b are defined as a' and b'. There are further defined vectors $s$ and $s$, which extend respectively from the origin of the three-dimensional coordinate system to points a and b, and vectors $s$ ' and $s$ ', which extend respectively from the origin of the three-dimensional coordinate system to points a' and b'.

It should be noted that points a' and b' are not necessarily different from points a and b. If, for example, the roller ball 162 has been rotated around an axis that includes point a, then point a' will be identical to point a. If the roller ball 162 is rotated in such a way that the rotated orientation of the roller ball 162 is identical to its original orientation, then a'=a and b'=b.

Figure 4A:
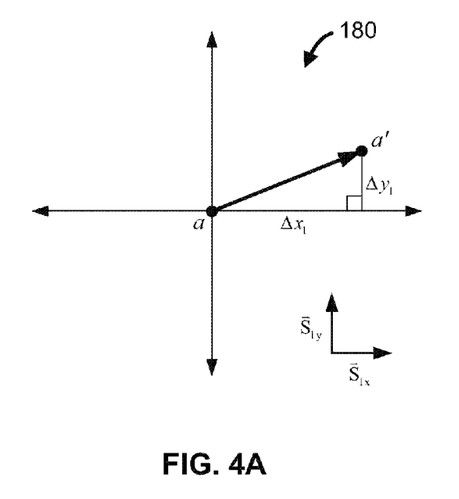
FIGS. 4A and 4B show graphs illustrating displacement of designated first and second points within respective first and second local regions on the surface of the roller ball shown in FIG. 3.
Figure 4B:
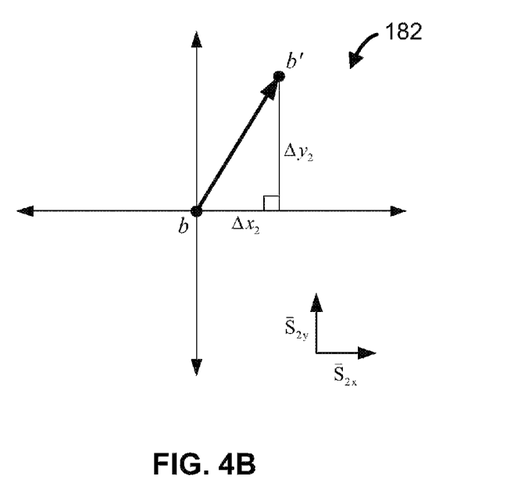

FIGS. 4A and 4B show graphs 180 and 182 representing, respectively, regions R1 and R2 in FIG. 3. It should be noted that graphs 180 and 182 are two-dimensional tangent-plane approximations of regions on the curved surface of the roller ball 162. There are a number of different techniques for mapping the roller ball surface in two dimensions. However, generally speaking, the size of regions R1 and R2 are sufficiently small relative to the margin of error that any ambiguities between mapping and approximation techniques will resolve sufficiently closely to each other to produce acceptable results. It will be appreciated from the present discussion that the scope of the present invention is not limited to a particular mapping technique.

FIG. 4A illustrates the movement of point a on the roller ball surface in region R1 to point a', and FIG. 4B illustrates the movement of point b on the roller ball surface in region R2 to point b'. As shown in FIGS. 4A and 4B, the respective movements of points a and b can be expressed as displacements along their respective x- and y-axes. Thus, the movement of point a can be expressed as $\Delta x_1$ and $\Delta y_1$, and the movement of point b can be expressed as $\Delta x_2$ and $\Delta y_2$. FIG. 4A further illustrates vectors $s_{1x}$ and $s_{1y}$, which are unit vectors in the three-dimensional coordinate system used to represent roller ball 162 that extend, respectively, in the direction of the local x- and y-axes in the FIG. 4A coordinate system. Similarly, FIG. 4B illustrates vectors $s_{2x}$ and $s_{2y}$, which are unit vectors in the three-dimensional coordinate system used to represent roller ball 162 that extend, respectively, in the direction of the local x- and y-axes in the FIG. 4B coordinate system.

For the purposes of the present discussion, it is assumed that the respective axes and unit vectors correspond in a natural way to the geometry of the respective sensors. It is further assumed that the sensors are positioned with respect to the roller ball 162 such that the R1 x-axis is perpendicular to the R1 y-axis, and that the R2 x-axis is perpendicular to the R2 y-axis. These assumptions simplify the calculations described hereinbelow. However, it will be appreciated that different axes may be used without departing from the present invention.

Figure 5A:
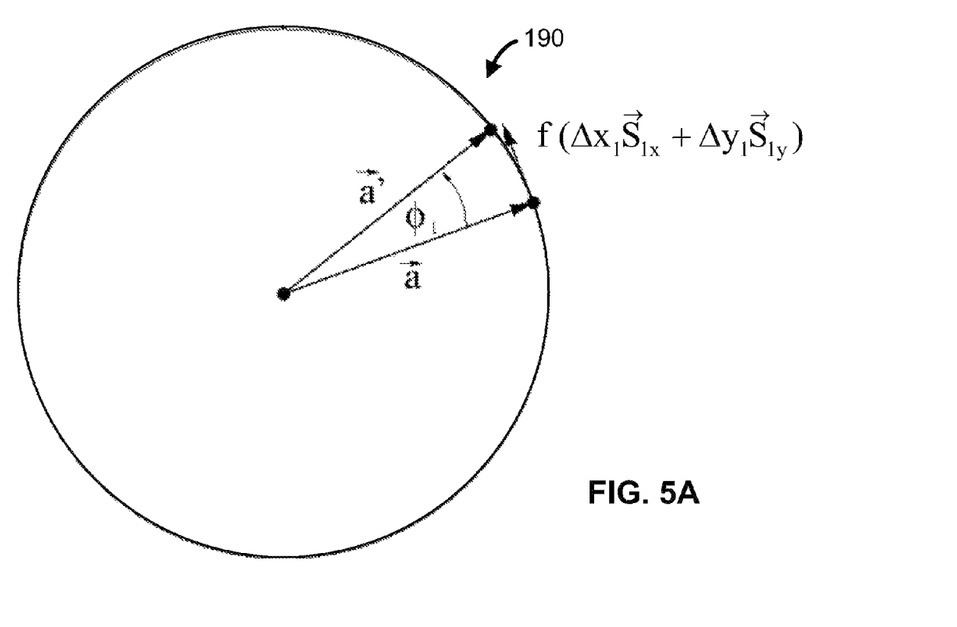
FIGS. 5A and 5B show great circles around the roller ball surface, further illustrating displacement of designated first and second points on the surface of the roller ball shown in FIG. 3.
Figure 5B:
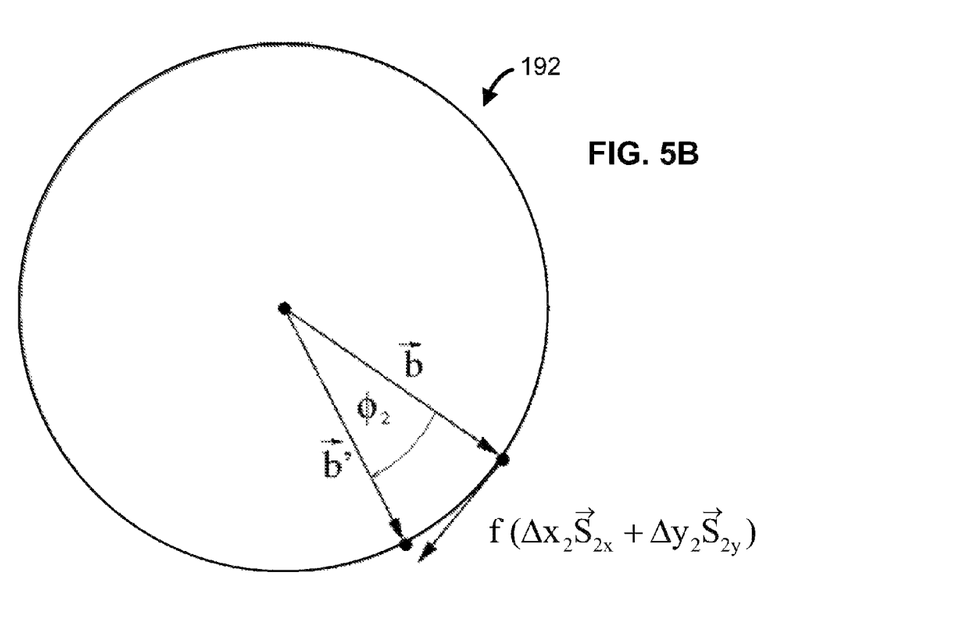

FIG. 5A shows a great circle 190 around the circumference of the roller ball 162 including points a and a', and FIG. 5B shows a great circle 192 around the circumference of the roller ball 162 including points b and b'. In FIGS. 5A and 5B, it will be seen that the displacement of the designated first and second points a and b is approximated by using values taken from the respective tangent planes at points a and b. However, as discussed above, acceptable results may be obtained from other techniques used to linearize the displacement data.

Figure 6:
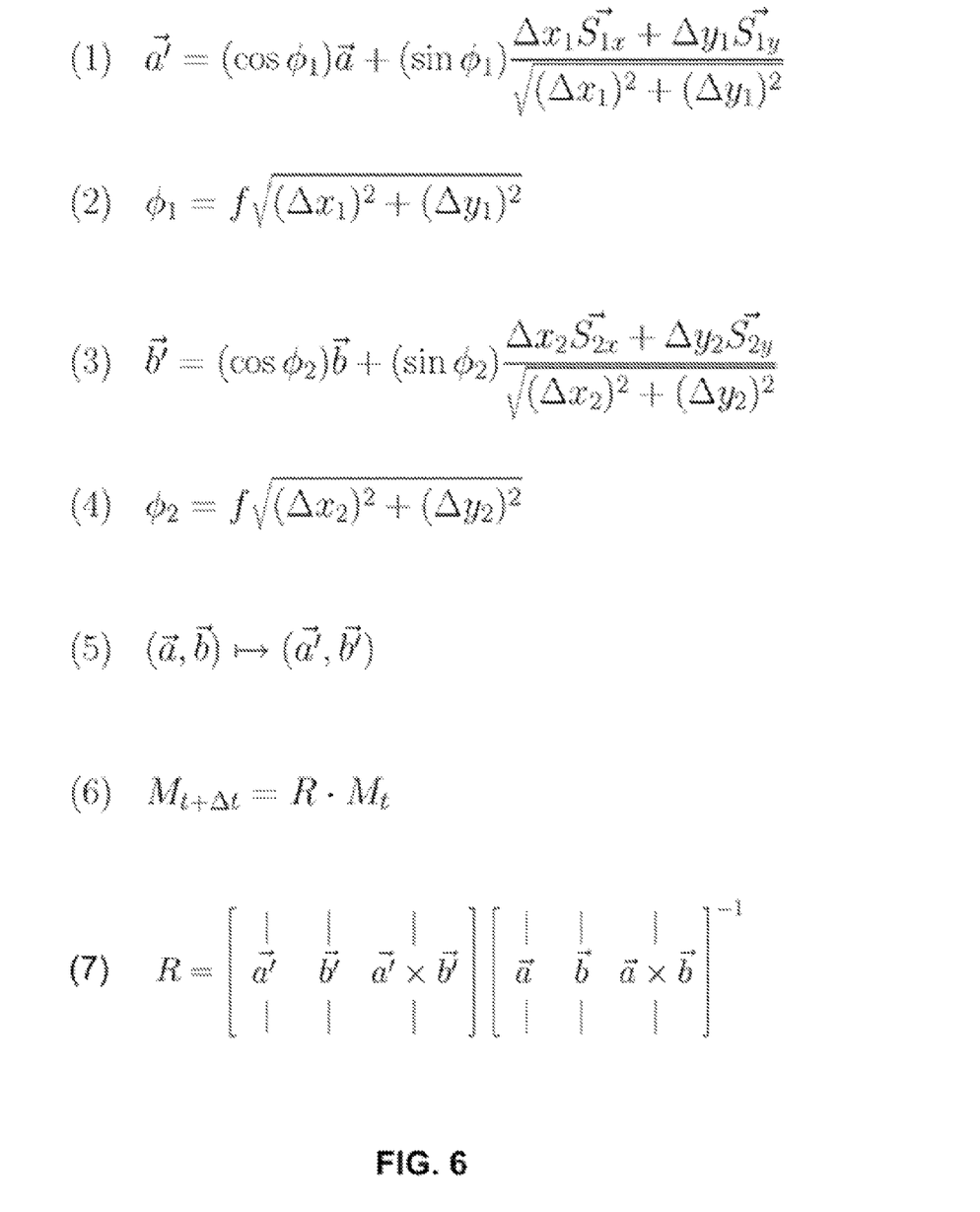
FIGS. 6-8 show a series of equations and a pseudocode listing, according to a further aspect of the present invention, for converting displacement data into a transformation to be applied to an image orientation matrix.

FIG. 6 is a list of equations setting forth the relationship between a, b, a', b', $\Delta x_1$, $\Delta y_1$, $\Delta x_2$ and $\Delta y_2$. In equations (1)-(4), it will be seen that it is possible to approximate ending position vectors $s$ ' and $s$ ' from starting position vectors $s$ and $s$, scalars $\Delta x_1$, $\Delta y_1$, $\Delta x_2$ and $\Delta y_2$, and unit vectors $s_{1x}$, $s_{1y}$, $s_{2x}$, and $s_{2y}$. Generally speaking the value of scaling factor f will be equal to the actual radius of the roller ball divided by the unit of length used by the outputs of the displacement data processors 166 and 168. As mentioned above, the value of the scaling factor f may be adjusted to change the ratio between the magnitude of the rotation of the roller ball and the magnitude of rotation of the displayed image. In addition, a negative value for scaling factor f may be chosen if it is desired to cause the rotation of the displayed image to be opposite to that of the roller ball input.

Thus, the respective movements of points a and b can be expressed as a mapping of vectors $s$ and $s$ to vectors $s$ ' and $s$ ', expressed in equation (5) in FIG. 6. This mapping uniquely identifies an orthogonal transformation R, so long as vectors $s$ and $s$ are not parallel, that is, so long as points a and b are non-identical and non-antipodal. As shown in equation (6), the image orientation matrix M is updated by replacing it with the matrix product of the transformation matrix R and the most recent image orientation matrix.

Equation (7) in FIG. 6 illustrates a general technique for populating the transformation matrix R. Two 3×3 matrices are constructed and then multiplied to each other. The first 3×3 matrix is constructed by populating its first two columns with vectors $s$ ' and $s$ ' and populating its third column with the cross product of vectors $s$ ' and $s$ '. The second matrix is constructed by inverting a 3×3 matrix, in which the first two columns are populated with vectors $s$ and $s$, and in which the third column is populated with the cross product of vectors $s$ and $s$. The fact that vectors $s$ and $s$ are not parallel guarantees that the second matrix is invertible.

The equations shown in FIG. 6 represent a level of abstraction, in which no assumptions are made as to the positions of the local coordinates within the three-dimensional roller ball coordinate system, or how the coordinate systems may be oriented. Further, no assumptions are made as to the locations of the designated first and second points.

There is now considered the application of the above-described techniques to a more specific case, in which the following assumptions are made: It is assumed that the first and second position sensors are located, respectively, at the points (0, 0, −1) and (−1, 0, 0) in the roller ball's three-dimensional coordinate system, corresponding to the bottom and back points of the roller ball 162. It is further assumed that the unit vectors described above have the following values: $s_{1x}$=(0, 1, 0); $s_{1y}$=(1, 0, 0); $s_{2x}$=(0, −1, 0); and $s_{2y}$=(0, 0, 1). It should be noted that the techniques described herein may be applied to other positions and orientations of the first and second sensors.

Figure 7:
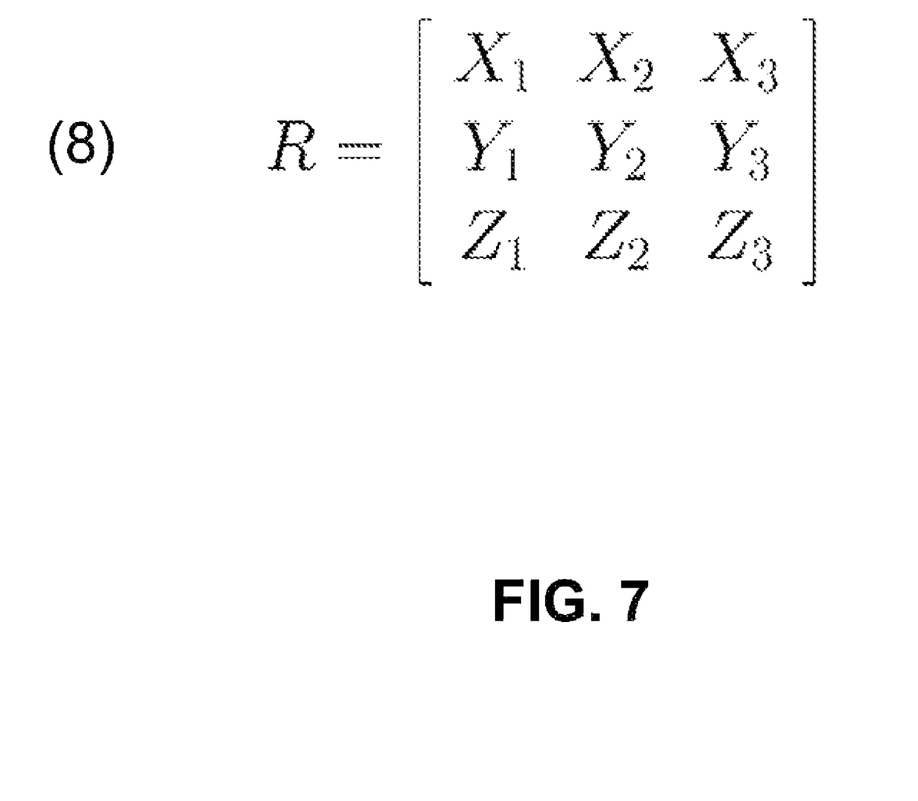

As shown in equation (8) in FIG. 7, the rotational transformation R is represented as three column vectors $(X_1, Y_1, Z_1)$, $(X_2, Y_2, Z_2)$, and $(X_3, Y_3, Z_3)$, which are used to populate a 3×3 matrix. The image orientation matrix M is initialized by populating it with a chosen initial set of values. Typically, the initial set of values will be those of the 3×3 identity matrix. However, other initial values may be chosen, as desired.

Figure 8:
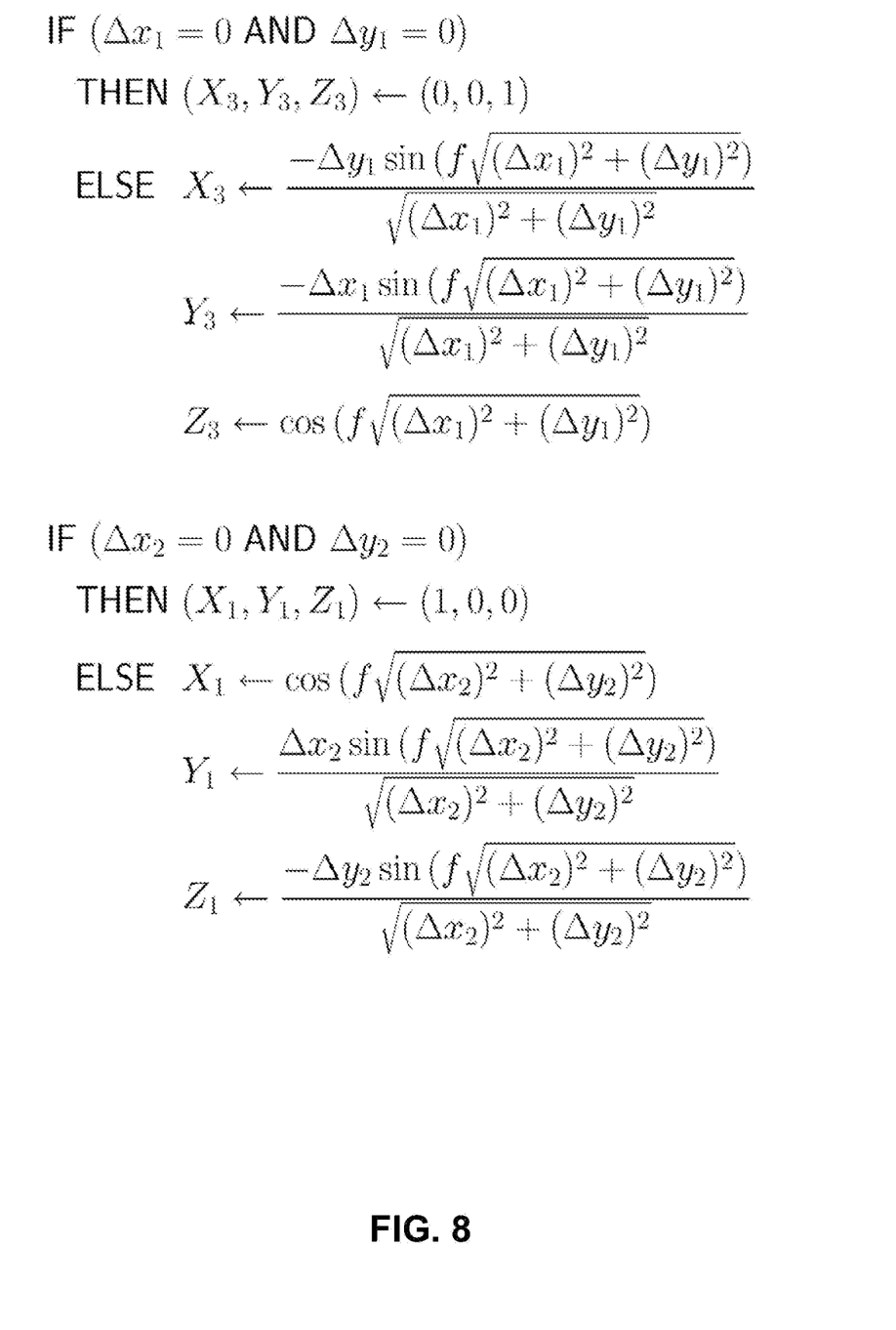

FIG. 8 shows a pseudocode listing illustrating a technique for populating the transformation matrix R. It will be seen in FIG. 8 that values for only two of the three column vectors need to be calculated directly from displacement data. In FIG. 8, the two column vectors for which values are calculated directly from displacement data are $(X_1, Y_1, Z_1)$ and $(X_3, Y_3, Z_3)$. The values for the third column vector $(X_2, Y_2, Z_2)$ are calculated by taking the appropriately ordered cross product of the other two vectors $(X_1, Y_1, Z_1)$ and $(X_3, Y_3, Z_3)$.

Figure 9:
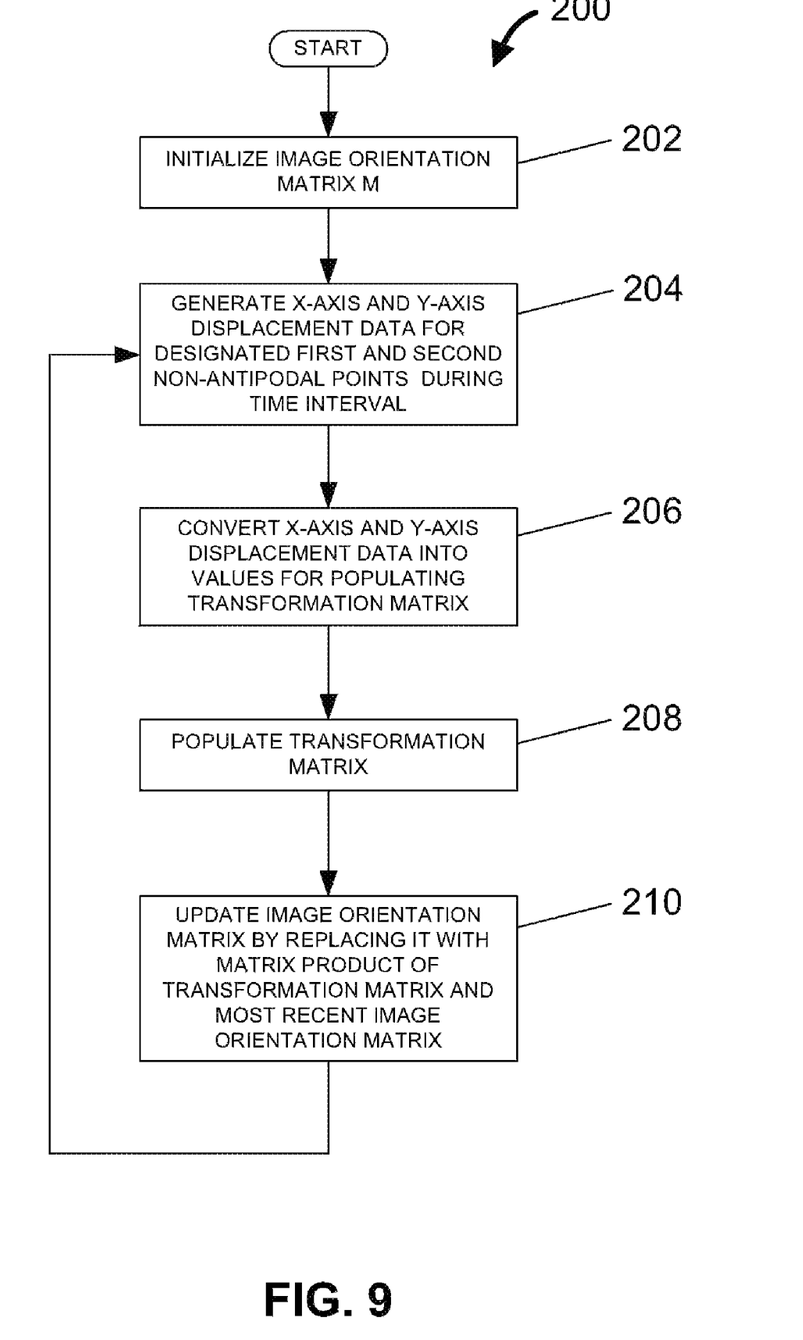
FIGS. 9 and 10 show flowcharts illustrating methods, according to further aspects of the present invention, for rotating displayed images in "freestyle" and "ortho" modes, respectively.

FIG. 9 shows a flowchart of a method 200 according to the present invention for rotating an image in a "freestyle" mode, in which the rotation of the displayed image matches the rotation of the roller ball around all axes. In step 202, an image orientation matrix M for a displayed image is initialized by setting it equal to any desired starting matrix. As mentioned above, the values for the identity matrix are typically chosen to initialize the image orientation matrix.

In step 204, x-axis and y-axis displacement data is generated for designated first and second non-antipodal points for displacement occurring during a time interval, between a starting time and an ending time. As mentioned above, the first and second points are designated for each time interval.

In step 206, the x-axis and y-axis displacement data are converted into values for populating a transformation matrix. In step 208, the transformation matrix is populated. As discussed above, in one technique according to the present invention, two out of three columns of a 3×3 transformation matrix are populated directly from calculations performed on the displacement data, and the third column is populated by taking the appropriately ordered cross product of the other two columns. In step 210, the image orientation matrix is updated by replacing it with the matrix product of the transformation matrix and the most recent image orientation matrix to cause the displayed image to rotate in correspondence with the rotation of the roller ball.

Figure 10:
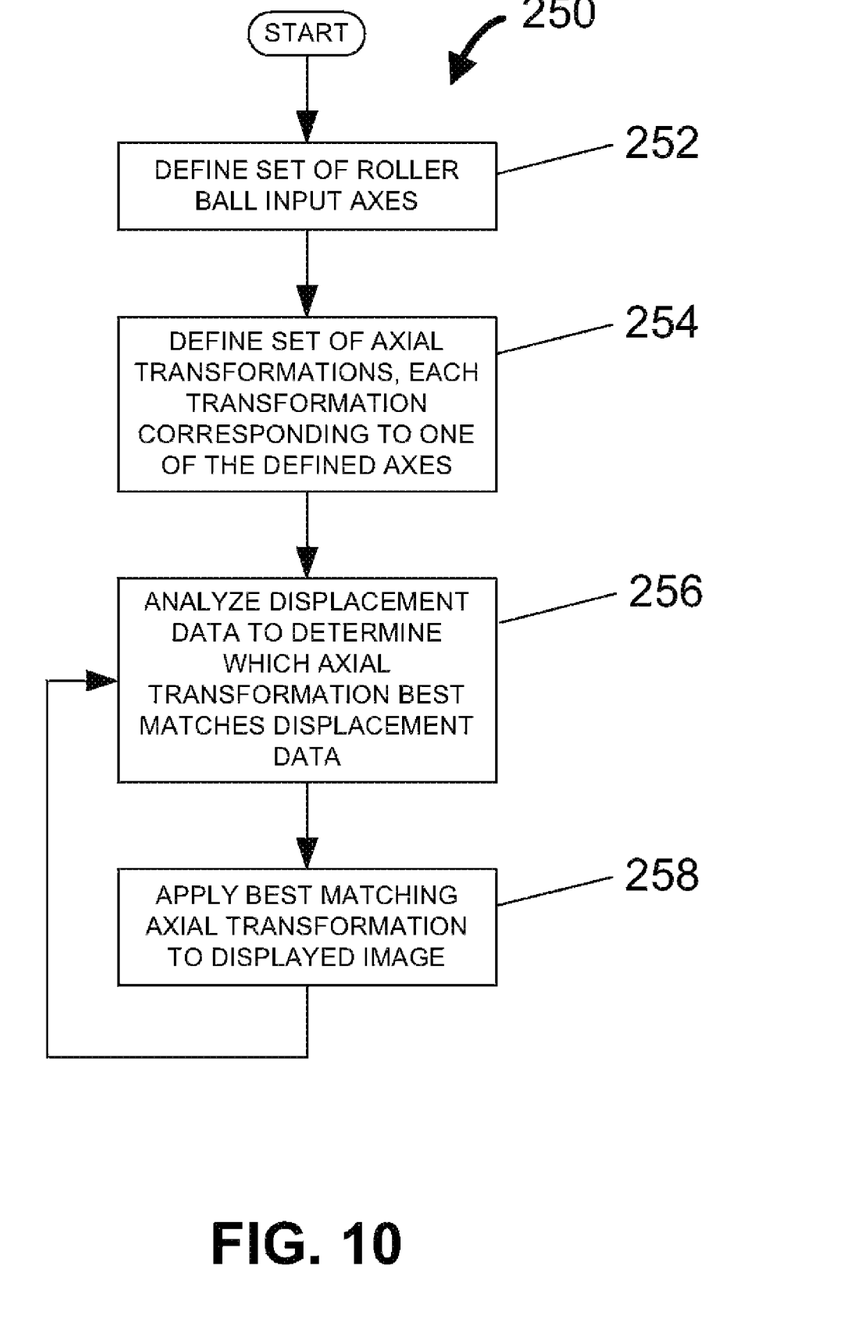

FIG. 10 shows a flowchart of a method 250 according to the present invention for rotating an image in "ortho" mode. The ortho mode incorporates the techniques employed in the freestyle mode, but adds to those techniques certain additional elements that allow the rotation of the displayed image to be "locked" around designated axes of roller ball rotation.

In step 252, a set of desired rotational axes are defined for the displayed image. In step 254, a set of roller ball axial transformations is defined, each transformation corresponding to rotation around one of the defined desired rotational axes for the displayed image. In step 256, the displacement data for the designated first and second points is analyzed to determine which of the defined roller ball axial transformations best matches the displacement data. In step 258, the best matching axial transformation is applied to the displayed image. Steps 256 and 258 are repeated for successive time intervals. It will be seen that, during a given time interval, the displayed image can only be rotated around one of the axes in the set of defined rotational axes.

It should be noted that the methods illustrated in FIGS. 9 and 10, and discussed above, may be combined in a system that is selectably switched back and forth between the freestyle and ortho modes of operation. A combined method could include, for example, a step in which it would be determined whether a user has selected the freestyle mode or the ortho mode. Such a combined method could also include, for example, a default mode of operation.

Figure 11:
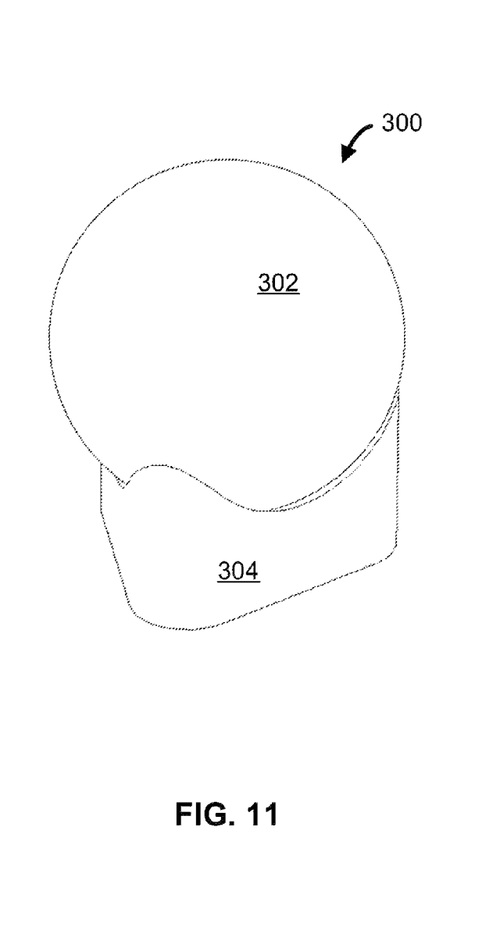
FIGS. 11 and 12 show, respectively, perspective and exploded views of a trackball according to a further aspect of the invention.
Figure 12:
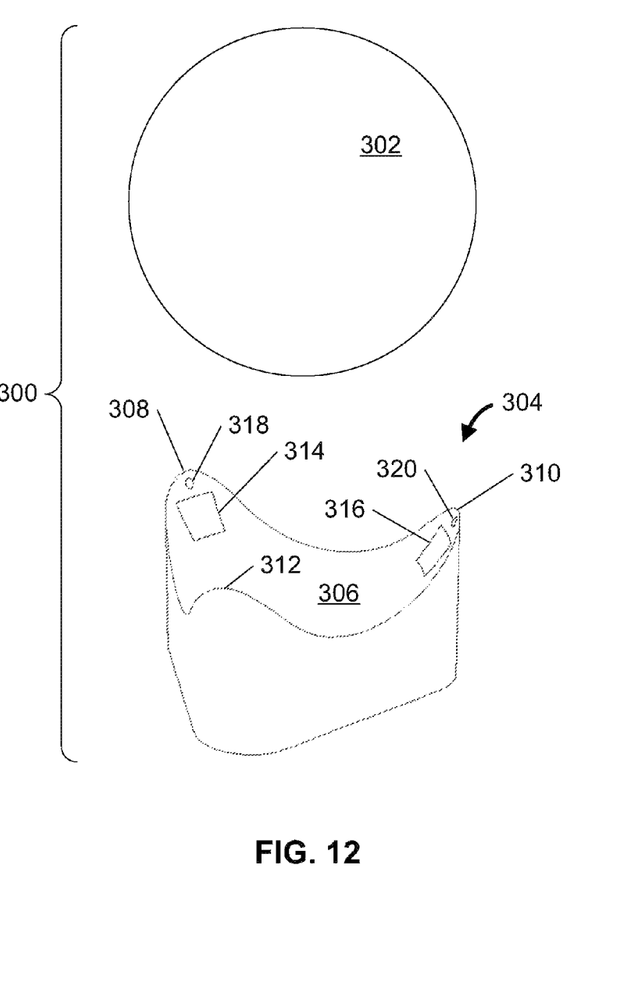

FIG. 11 shows a perspective view of an exemplary trackball 300 according to a further aspect of the invention, and FIG. 12 shows an exploded view of the trackball 300 shown in FIG. 11. From the above discussion, it will be appreciated that it is generally advantageous for a trackball system according to the present invention to have a roller ball having a relatively large exposed area. Allowing a user to place his or her fingers entirely around the trackball would tend to enhance the user's intuitive feel for the rotation of the displayed image.

In FIGS. 11 and 12, the trackball system 300 includes a roller ball 302 that is seated on a supporting base 304, such that the roller ball 302 is freely rotatable around any axis through its center. According to the present aspect of the invention, the roller ball is held onto the base 304 by gravity.

As shown in FIG. 12, the base 304 has a rounded triangular profile. The base's upper surface 306 is shaped to conform to the underside of the roller ball 302. The base 304 further includes three rounded vertices 308, 310, and 312 that extend upwardly around the surface of the roller ball 302.

As further shown in FIG. 12, the base's upper surface 306 is provided with first and second windows 314 and 316 that provide communication between the surface of the roller ball 302 and first and second position sensors (not shown). According to the present aspect of the invention, the position sensors are provided by arrays of photodetectors, as described above.

The first and second sensor windows 314 and 316 are located proximate to two of the three rounded vertices 308 and 310 of the pedestal. However, as discussed above, the location of the sensors may be modified without departing from the spirit of the present invention, so long as the sensors are non-antipodal.

According to the present aspect of the invention, the roller ball 302 rests on three nubs 318 and 320 (third nub not shown) protruding from the base's upper surface 306. A first nub 318 is positioned proximate to vertex 308, a second nub 320 is positioned proximate to vertex 310, and a third nub (not shown) is positioned proximate to vertex 312. If desired, one or more bearings or rollers may be added to the base's interior surface 306 to provide additional support to the roller ball 302 or to facilitate the free rotation of the roller ball 302.

According to a further aspect of the invention, the roller ball 302 is held in place only by gravity. Thus, the roller ball 302 is freely removable from the base 304. According to this aspect of the invention, it would be possible to provide different roller balls 302 for different uses.

The diameter of the roller ball 302 depends upon the desired feel for the trackball 300. For example, it would be possible to fabricate a roller ball 302 and base 304 combination in which the roller ball is sufficiently large to allow a user to place his or her entire hand on top of the roller ball 302. Alternatively, it would be possible to fabricate a roller ball 302 and base 304 combination that is sufficiently small to allow a user to manipulate the roller ball with one finger, or a thumb and finger.

As mentioned above, the present invention can be applied in different contexts. For example, it will be seen that in addition to being used to control the rotation of a displayed image, the invention can be modified to control the rotation of a physical object.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for rotating a three-dimensional image displayed by a computer, comprising:
   (a) using a trackball connected to the computer to provide input to the computer, the trackball including a roller ball having a spherical, scannable surface and being rotatable around its center point;
   (b) defining a coordinate system, within which there are defined first and second local scanning regions corresponding respectively to first and second portions of the roller ball surface to be scanned, and within which there are further defined non-antipodal first and second reference locations respectively located within the first and second local scanning regions;

(c) scanning the first and second portions of the roller ball surface at a starting time and at an ending time of a defined time interval;

(d) at the starting time, designating respective first and second non-antipodal points within the first and second scanned portions of the roller ball surface, wherein the designated first and second non-antipodal points comprise first and second points of the roller ball surface that are located, respectively, at the first and second reference locations at the starting time, wherein the designated first and second non-antipodal points are selected without reference to any previously designated points on the roller ball surface;

(e) detecting changes in position of the first and second non-antipodal points occurring during the time interval, wherein any detected changes in position correspond to respective displacements within the first and second local scanning regions relative to the first and second reference locations, wherein displacement data generated during the time interval, comprising magnitude and direction of each displacement, uniquely identifies a change in roller ball orientation occurring during the time interval, without reference to an absolute orientation of the roller ball;

(f) using the displacement data to generate a transformation representing the change of rotational orientation of the roller ball; and (g) applying the transformation to the displayed computer image to rotate the displayed image around an image pivot point in correspondence with the rotation of the roller ball around its center point.

2. The method of claim 1, wherein steps (c)-(g) are repeated for successive time intervals.

3. The method of claim 2, wherein the time intervals are of sufficiently short duration to create a visual impression of a smooth, continuous rotation of the displayed image.

4. The method of claim 1, wherein a scaling factor is applied to the displacement data such that the magnitude of rotation of the displayed image around its pivot point matches the magnitude of rotation of the roller ball around its center point.

5. The method of claim 1, further including:
defining a set of roller ball input axes;
defining a set of axial transformations, each axial transformation corresponding to rotation of the roller ball around one roller ball axis;
analyzing the displacement data to determine which of the defined axial transformations best matches the displacement data; and
applying the best matching axial transformation to the displayed computer image to rotate the displayed image around an image pivot point in correspondence with the rotation of the roller ball around the axis corresponding to the best matching axial transformation.

6. The method of claim 1,
wherein the rotational orientation of the displayed image is represented and controlled by an image orientation matrix;
wherein the rotational transformation is represented by a transformation matrix;
wherein step (f) includes populating the transformation matrix using data derived from the displacement data; and
wherein step (g) includes applying the rotational transformation to the displayed image includes multiplying the image orientation matrix by the transformation matrix.

7. The method of claim 1, wherein step (e) includes:
mapping the designated first and second non-antipodal points onto respective first and second reference locations in at least one coordinate system having an x-axis and a y-axis; and
determining the x-axis displacement and y-axis displacement relative to the first and second reference locations.

8. The method of claim 7, wherein in step (b) the coordinate system is defined by an array of photodetectors.

9. The method of claim 7, wherein step (e) further includes:
mapping the designated first and second non-antipodal points onto respective first and second reference locations in respective first and second coordinate systems, each having an x-axis and a y-axis; and
determining the x-axis displacement and y-axis displacement relative to the first and second reference locations in their respective coordinate systems.

10. The method of claim 9, wherein the first and second coordinate systems are defined by respective first and second arrays of photodetectors.

11. A system for rotating a three-dimensional computer image, comprising:
a computer including an image rotator for rotating the three-dimensional image around an image pivot point;
a trackball corrected to the computer, the trackball including a roller ball having a spherical, scannable surface, the roller ball being rotatable around its center point,
wherein the trackball includes means for defining a coordinate system and for defining first local scanning region and a second local scanning region within the defined coordinate system corresponding respectively to first and second portions of the roller ball surface to be scanned, and within which there are further defined non-antipodal first and second reference locations respectively located within the first and second local scanning regions;
the trackball further including at least one sensor for scanning the first and second portions of the roller ball surface, and for monitoring designated first and second non-antipodal points at the roller ball surface, wherein the designated first and second non-antipodal points comprise first and second points of the roller ball surface that are located, respectively, at the first and second reference locations at a starting time of a scanning time interval, wherein the designated first and second non-antipodal points are selected without reference to any previously designated points on the roller ball surface;
wherein the at least one sensor includes means for detecting changes in position of the first and second non-antipodal points occurring during the time interval, wherein any detected changes in position correspond to respective displacements within the first and second local scanning regions relative to the first and second reference locations, wherein displacement data generated during the time interval, comprising magnitude and direction of each displacement, uniquely identities a change in roller ball orientation occurring during the time interval, without reference to an absolute orientation of the roller ball; and
a transformation generator connected to the sensor for generating a transformation based upon the displacement data, the transformation representing a change in rotational orientation of the roller ball occurring during the time interval,
the image rotator receiving the transformation as an input and applying the transformation to the displayed image to rotate the image around the image pivot point in correspondence with rotation of the roller ball around its center point.

12. The system of claim 11, wherein the sensor comprises:

at least one array of photodetectors positioned to optically detect displacement of points on the roller ball surface; and signal processing circuitry for converting the output of the photodetector array into displacement data.

13. The system of claim 12, wherein the array of photodetectors includes means for defining at least one coordinate system having an x-axis and a y-axis, and wherein the sensor includes means for converting the output of the photodetector array into data representing displacement along the x-axis and y-axis of the coordinate system.

14. The system of claim 13, including:

first and second sensors, each sensor including an array of photodetectors defining respective first and second coordinate systems, the first and second photosensors providing as outputs data representing displacement of the designated first and second non-antipodal points along the x-axis and the y-axis of the first and second coordinate systems, respectively.

15. A trackball, comprising:

a base;

a roller ball seated on top of the base, the roller ball having a spherical, scannable surface and being rotatable around its center point;

means for defining a defined coordinate system and for defining a first local scanning region and a second local scanning region within the defined coordinate system corresponding to first and second portions of the roller surface to be scanned; and at least one sensor for scanning the first and second portions of the roller ball surface, and for monitoring designated first and second non-antipodal points at the roller ball surface, wherein the first non-antipodal point corresponds to a first reference location in the first local scanning region and the second non-antipodal point corresponds to a second reference location in the second local scanning region, wherein the at least one sensor includes, means for detecting changes in position of the first and second non-antipodal points occurring during a time interval having a starting time and an ending time, wherein any detected changes in position correspond to respective displacements within the first and second local scanning regions relative to the first and second reference locations, wherein displacement data generated during the time interval, comprising magnitude and direction of each displacement, uniquely identifies a change in roller ball orientation occurring during the time interval, without reference to an absolute orientation of the roller ball, and wherein the first and second non-antipodal points are newly designated at the starting time of each time interval based upon their respective proximity to the first and second reference locations, without reference to any previously designated points on the roller ball surface.

16. The trackball of claim 15, wherein the sensor includes means for defining a coordinate system having an x-axis and a y-axis, such that the generated displacement data includes x-axis and y-axis displacement data for each of the designated first and second non-antipodal points.

17. The trackball of claim 16, wherein the sensor includes an array of photodetectors that are positioned to optically detect displacement of points on the roller ball surface, including the designated first and second non-antipodal points, the array of photodetectors defining the coordinate system.

18. The trackball of claim 15, wherein the base has a rounded triangular profile, with three curved, upwardly extending support vertices.

19. The trackball of claim 18, thither including at least one sensor window proximate to a vertex, the sensor window providing access between the surface of the roller hall and the sensor.

* * * * *